(12) United States Patent
Guigues

(10) Patent No.: US 10,902,560 B2
(45) Date of Patent: Jan. 26, 2021

(54) OR RELATING TO FILTERS

(71) Applicant: Sony Depthsensing Solutions SA/NV, Brussels (BE)

(72) Inventor: Laurent Guigues, Brussels (BE)

(73) Assignee: Sony Depthsensing Solutions SA/NV, Brussels (BE)

(*) Notice: Subject to any disclaimer, the term of this patent is extended or adjusted under 35 U.S.C. 154(b) by 115 days.

(21) Appl. No.: 16/086,437

(22) PCT Filed: Mar. 31, 2016

(86) PCT No.: PCT/EP2016/057117
§ 371 (c)(1),
(2) Date: Sep. 19, 2018

(87) PCT Pub. No.: WO2017/167382
PCT Pub. Date: Oct. 5, 2017

(65) Prior Publication Data
US 2019/0096039 A1    Mar. 28, 2019

(51) Int. Cl.
*G06T 5/00*    (2006.01)
*G06T 5/20*    (2006.01)

(52) U.S. Cl.
CPC .............. *G06T 5/002* (2013.01); *G06T 5/20* (2013.01); *G06T 2207/10012* (2013.01);
(Continued)

(58) Field of Classification Search
CPC . G06T 5/002; G06T 5/20; G06T 2207/10012; G06T 2207/20192; G06T 2207/10028; G06T 2207/20028
(Continued)

(56) References Cited

U.S. PATENT DOCUMENTS 7,319,797 B2    1/2008  Hung
10,074,160 B2*  9/2018  Kim ................... G06T 13/40

FOREIGN PATENT DOCUMENTS

EP        2095296        9/2009
WO    WO 2008/128568 A1  10/2008

OTHER PUBLICATIONS

International Search Report and Written Opinion for International Application No. PCT/EP2016/057117 dated Nov. 8, 2016.
(Continued)

*Primary Examiner* — Daniel G Mariam
(74) *Attorney, Agent, or Firm* — Wolf, Greenfield & Sacks, P.C.

(57) ABSTRACT

Described herein is method for applying noise reduction to multi-dimensional input data by applying a multi-dimensional approximation function to each point in the input data whilst maintaining definition for each discontinuity (620) present in the input data. A control lattice including a plurality of control points (630) is superposed on the input data such that, for each data point, a number of control points surround the data point (640). For each control point (630), a value which is a function of neighbouring data points is computed, and from, at least values of the neighbouring control points, determining an approximation function, which when applied to the input data provides filtered output data. Weighting is applied to at least control point associated with a data point in the vicinity of a discontinuity to maintain the sharpness of the discontinuity during the noise reduction process.

15 Claims, 9 Drawing Sheets

(52) U.S. Cl.
CPC ............... *G06T 2207/10028* (2013.01); *G06T 2207/20028* (2013.01); *G06T 2207/20192* (2013.01)

(58) Field of Classification Search
USPC .......................................... 382/260–266, 275
See application file for complete search history.

(56) References Cited

OTHER PUBLICATIONS

Hou et al., Cubic Splines for Image Interpolation and Digital Filtering. IEEE Transactions on Acoustics, Speech and Signal Processing, IEEE Inc. 1978;ASSP-26(6):508-17.

Lee et al., Scattered data interpolation with multilevel B-Spline. IEEE Transactions on Visualization and Computer Graphics. 1997;3(3):228-44.

Peyrovian et al., Restoration of noisy blurred images by a smoothing spline filter. Applied Optics. 1977;16(12):3147-53.

Saint-Marc et al., Adaptive Smoothing: A General Tool for Early Vision. IEEE Transactions on Pattern Analysis and Machine Intelligence. 1991;13(6):514-29.

Sinha et al., A Two-Stage Algorithm for Discontinuity-Preserving Surface Reconstruction. IEEE Transactions on Pattern Analysis and Machine Intelligence, IEEE Computer Society. 1992;14(1):36-55.

Vieira et al., Smoothing of Noisy Laser Scanner Generated Meshes Using Polynomial Fitting and Neighborhood Erosion. Journal of Mechanical Design, A S M E International. 2004;126:495-503.

\* cited by examiner

OR RELATING TO FILTERS

CROSS REFERENCE TO RELATED APPLICATIONS

This Application is a national stage filing under 35 U.S.C. § 371 of International Patent Application Serial No. PCT/EP2016/057117, filed Mar. 31, 2016, entitled "IMPROVEMENTS IN OR RELATING TO FILTERS," the entire contents of which is incorporated by reference herein.

TECHNICAL FIELD

The present disclosure generally relates to improvements in or relating to filters and is more particularly concerned with a spatial filter whose aim is to remove noise in an image while preserving edges or discontinuities.

TECHNICAL BACKGROUND

Many areas of computer vision systems, signal analysis, experimental science, require the use of noise-reduction filters to reduce the amount of noise present in input data. The input data may be one-dimensional, in which case the data is usually represented by a curve, or it may be two-dimensional in which case it usually represents an image. In the field of image processing, such filters are usually convolved to an image, as the Gaussian convolution filter. The application of a noise reduction filter to a set of noisy data, results in a smoothing of the data.

Other methods include curve interpolation and curve fitting, which can be applied in one dimension and repeated along the other dimensions. An approximation function used as a model is interpolated or fitted to data using, for example, a regression algorithm minimizing the square error between the model function and the experimental data or curve, such as, a least squares fitting method.

Spline curves of third order are often used as approximation functions and are particularly adapted to noise removal. They have the advantage of being smooth. In particular, splines of third order have only one curvature since third order polynomials cannot have strong variations, and these types of curves are ideal to smooth data, and, therefore, removing noise.

Seungyong Lee et al., referred hereinafter as "Lee et al.", describe in "Scattered data interpolation with multilevel B-splines", *IEEE Transactions on Visualization and Computer Graphics*, vol. 3, no. 3, pages 228 to 244, July to September 1997, a fast algorithm for the interpolation and approximation of scattered data with B-splines. An input image is sampled using a regular grid and a hierarchy of control lattices are used to generate a sequence of functions whose sum approaches a desired approximation function. Different fast B-spline fitting algorithms particularly adapted for scattered two dimensional data are described which are capable of fitting the two-dimensional scattered data using different resolutions.

However, when an edge or a discontinuity is present in the experimental data, this edge is smoothed by the spline fitting method described in Lee et al. and appears blurred. The sharpness of the edges is lost, even though the edge is not part of the noise in the image. This is a common problem of all smoothing techniques, including convolution filters.

Applying the method disclosed in Lee et al. to three-dimensional images, for example to a depth map, interpolates depth values at edges between foreground regions and background regions to provide depth values which can be classified neither as foreground nor as background.

SUMMARY

In accordance with one aspect of the present disclosure, there is provided a method of noise reduction for multi-dimensional input data including a plurality of data points spaced from one another in each dimension, the method including the steps of:

a) defining at least one control lattice for the input data, each control lattice having a plurality of control points separated by a predetermined spacing;

b) superposing each control lattice on the input data;

c) defining, for each data point in the input data, a number of control points surrounding the input data point;

d) computing, for each control point, a value which is a function of neighbouring data points;

e) determining, for each data point, an approximation function from at least values of neighbouring control points;

f) using the approximation function to filter the input data to generate filtered output data; and e) applying a weighting to at least one control point associated with a data point in the vicinity of a discontinuity.

In accordance with another object of the present disclosure, there is provided an image processing system including:

an imaging system configured to capture at least one image; and circuitry configured to perform the steps of the method as described above.

In accordance with a further aspect of the present disclosure, there is provided a computer-readable data storage medium containing computer-executable instructions for carrying out a method as described above.

BRIEF DESCRIPTION OF THE DRAWINGS

For a better understanding of the present disclosure, reference will now be made, by way of example only, to the accompanying drawings in which:—

DETAILED DESCRIPTION OF EMBODIMENTS

Figure 1:
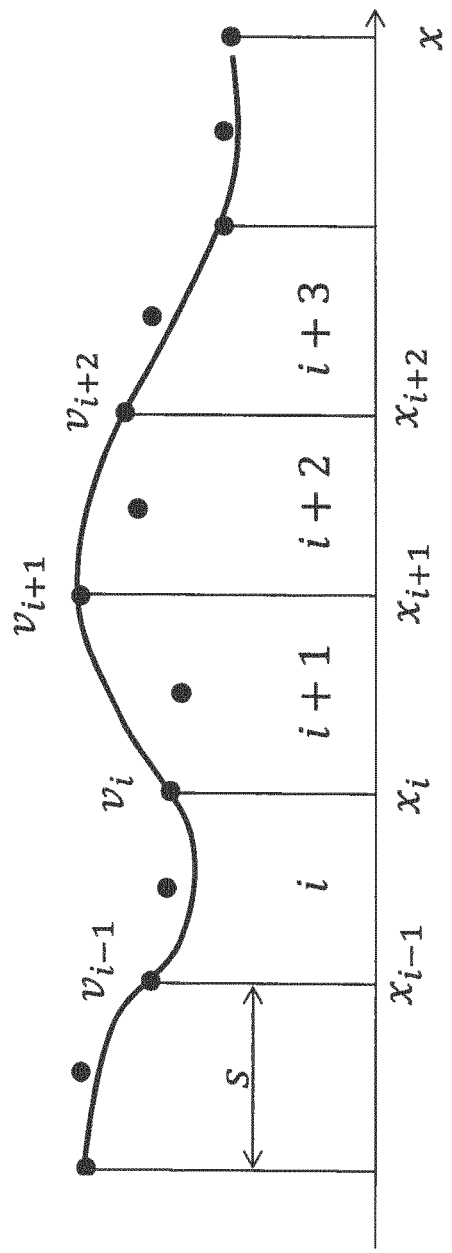
FIG. 1 illustrates a conventional spline curve interpolating noisy experimental data.

The present disclosure will be described with respect to particular embodiments and with reference to certain drawings but the disclosure is not limited thereto. The drawings described are only schematic and are non-limiting. In the drawings, the size of some of the elements may be exaggerated and not drawn on scale for illustrative purposes.

The method according to the present disclosure can be used in various fields, including signal processing, medical imaging, etc. This method can in particular be used for removing noise in depth map images captured by a three-dimensional imaging system. Depth maps are affected by various types of noise, including random noise and systematic noise.

FIG. 1 illustrates the interpolation of experimental data $(x_i, y_i)$ represented by the crosses, with spline curves. In the example, the x-axis coordinates of the data are separated by a regular spacing s. However, in the general case, the values $x_i$ can arbitrarily be spaced. In the interpolation case, the values of the spline at the interpolation points $x_i$ correspond to the values $y_i$ of the experimental data, and the goal of the interpolation is to define a value y at any possible location x between the experimental data. The points where the spline values are fixed are called control points. They are represented with dots in FIG. 1. The interval between two consecutive control points is a segment i. In the interpolation case, the control points of the spline correspond to the experimental points. The locations of all the control points form a spline lattice. Each segment is interpolated by a spline curve of third order having the following expression:

$$y = a_i x^3 + b_i x^2 + c_i x + d_i$$

where parameters $a_i$, $b_i$, $c_i$, $d_i$ of each segment i are calculated such that the values at the control points ending a segment i corresponds to the values of the data. In addition, tangential and curvature continuity are verified at each control point so that no abrupt change in slope or in curvature occurs between two adjacent segments. Given the control points $(x_i, y_i)$, spline interpolation provides a function S which is able to return a value $S(x)$ at any arbitrary point x in a segment.

Figure 2:
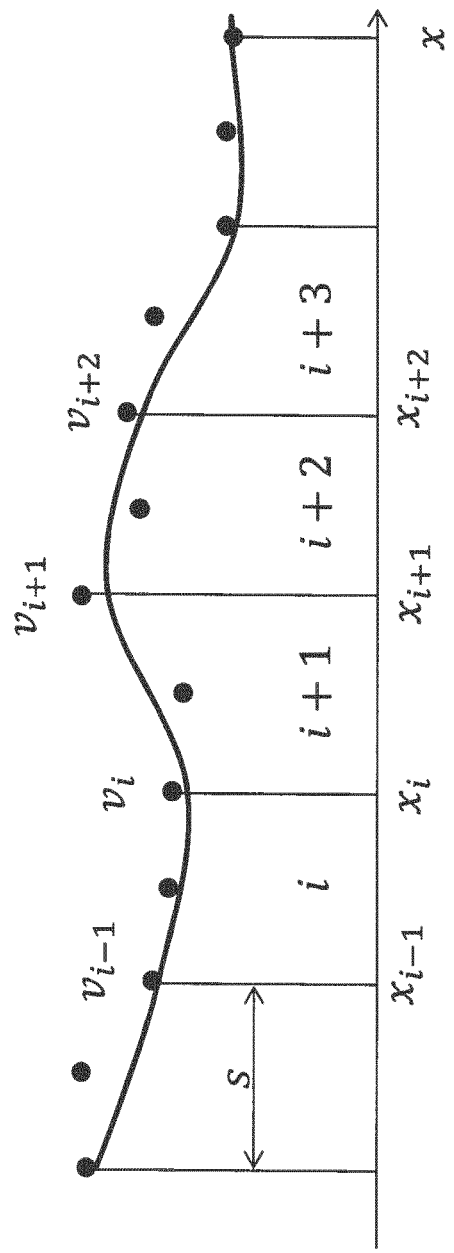
FIG. 2 illustrates a conventional spline curve fitting or approximation for noisy experimental data.

FIG. 2 illustrates fitting experimental data with spline curves. In this case, the spline control point positions $u_i$ are fixed independently of the input data positions $x_i$, usually using a regular spacing s. The problem is then to find the values $v_i$ of the spline at the control points so that the spline interpolation S defined by $(u_i, v_i)$ best fits the input data $(x_i, y_i)$, usually in the least square sense, i.e. so that the sum of residuals $\Sigma(S(x_i) - y_i)_2$ is minimized. The spline values at the control points $v_{i-1}$, $v_i$, $v_{i+1}$, $v_{i+2}$ control the shape of the curve but do not correspond to the experimental data as shown. The continuity requirements of the curve at the control points are the same as those described above for interpolation.

In one dimension, the value of a point of an approximation function of degree n is influenced by the value of n+1 neighbouring control points. Therefore, n+1 segments of curve are necessary to determine the value of one point of the approximation function. The approximation function used herein is a third degree approximation function, and therefore four control points and four segments are used for the determination of the value of a point of the function.

The following set of basic functions, called uniform cubic B-spline basis functions, are defined over four consecutive segments:

$$B_0(u) = (1-u)^3/6$$

$$B_1(u) = (3u^3 - 6u^2 + 4)/6$$

$$B_2(u) = (-3u^3 + 3u^2 + 3u + 1)/6$$

$$B_3(u) = u^3/6$$

where $0 \leq u < 1$ for each segment. The sum of these four weighting functions is always 1, and indicates the weight or weighting assigned to each control point.

The input data is defined over a domain of size m in one dimension, m×n in two dimensions, etc. wherein m and n are integers. This domain is referred to as the input data domain. In order to approximate the input data, an approximation function $S(x)$ in one dimension, or $S(x,y)$ in two dimensions, is defined as a linear combination of the uniform cubic B-spline basis functions. These B-spline basis functions are defined over a control lattice of size m+3 in one dimension and (m+3)×(n+3) in two dimensions superposed onto the input data domain. $u_k$, and $(u_{kl}^x, u_{kl}^y)$ are the positions of the k-th and kl-th control points of the control lattice, and $v_k$ and $v_{kl}$ are the values of the spline at the k-th and kl-th control points of the control lattice which define the approximation function, in one and two dimensions respectively.

In one dimension, the value of the approximation function $S(x)$ of a point x falling into segment i (i.e. such that $u_i \leq x < u_{i+1}$) is given by:

$$S(x) = \sum_{k=0}^{3} w_k(a) v_{i-1+k}$$

wherein a is the normalized coordinate of the point x in segment i $$a = (x - u_i)/s$$

and the weight $w_k$ is the basis function $B_k$.

Figure 3:
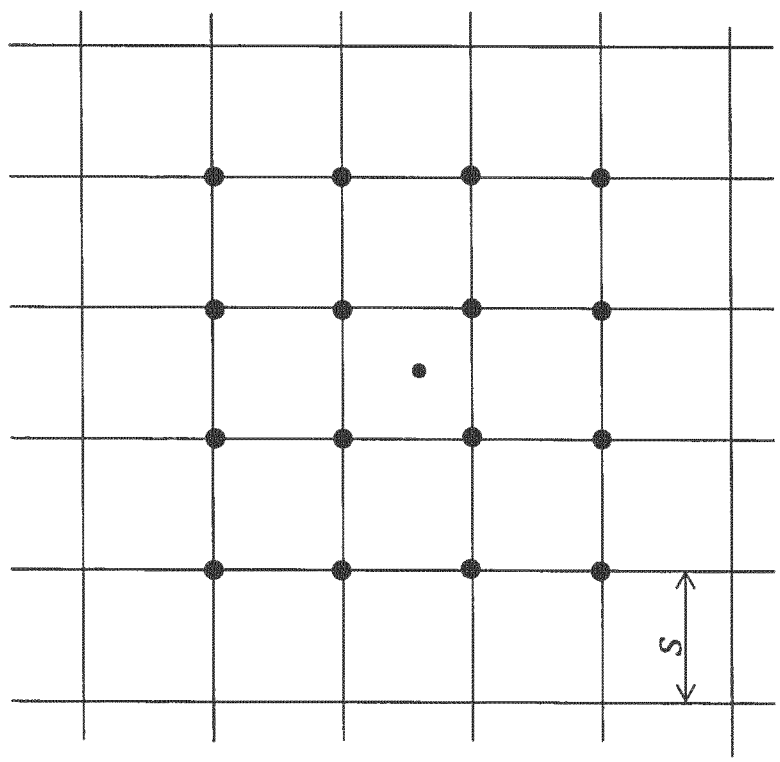
FIG. 3 illustrates a data point and its sixteen associated control points.

In two dimensions, the following is obtained based on a similar reasoning. For a point (x,y) falling into the spline tile (i,j) (i.e. x falling in segment i and y falling in segment j)

$$S(x, y) = \sum_{k=0}^{3} \sum_{l=0}^{3} w_{kl}(a, b) v_{i-1+k, j-1+l}$$

where $$a = (x - u_{ij}^x)/s$$

$$b = (y - u_{ij}^y)/t$$

$$w_{kl}(a,b) = B_k(a) B_l(b)$$

and where s and t represent the spline control lattice spacing in horizontal and vertical direction respectively. In two dimensions, the value of each point of the approximation function is therefore influenced by the value of sixteen control points, as illustrated in FIG. 3, the point is shown in a square defined by the innermost four control points.

For the two-dimensional case (the one-dimensional case being readily derivable from the two-dimensional case), the values $v_{kl}$ of the control points are unknown. Lee et al. have proposed a way to estimate the values $v_{kl}$ so that the resulting spline function best fits an input image in least square sense. Their approximation method includes two steps: first estimate the spline values $v_{kl}$ for each input image pixel independently and then retain a unique spline value for each control point which minimizes the overall approximation error.

Let $(x_c, y_c, z_c)$ be an input image point, where $(x_c, y_c)$ represents the 2D position of the pixel in the input image and $z_c$ represents the value of the image at that pixel. If the point falls into the spline tile (i,j) then Lee et al. show that the values of the 16 control points which are influenced by the input point can be estimated by $$v^c_{i-1+k,j-1+l} = \frac{w_{kl}(a,b)z_c}{\sum_{m=0}^{3}\sum_{n=0}^{3}w^2_{mn}(a,b)}$$

For k=0 . . . 3 and l=0 . . . 3, with w and a, b defined as previously. Let us denote by $W^c_{i-1+k,j-1+l} = w_{kl}(a, b)$ the contribution to the spline control point (i−1+k,j−1+l) associated with the input point c.

In a second step, Lee et al. show that a least square estimate of a unique value for each control point is provided by $$v_{i,j} = \frac{\sum_c (W^c_{ij})^2 v^2_{ij}}{\sum_c (W^c_{ij})^2}$$

where $v_{i,j}^c$ is the estimate of the value of the control point (0) provided by the cth input image point and $W_{i,j}^c$ is contribution of input point c to the spline value at control point (i,j) as defined above. This is described in more detail in Lee et al.

Figure 4:
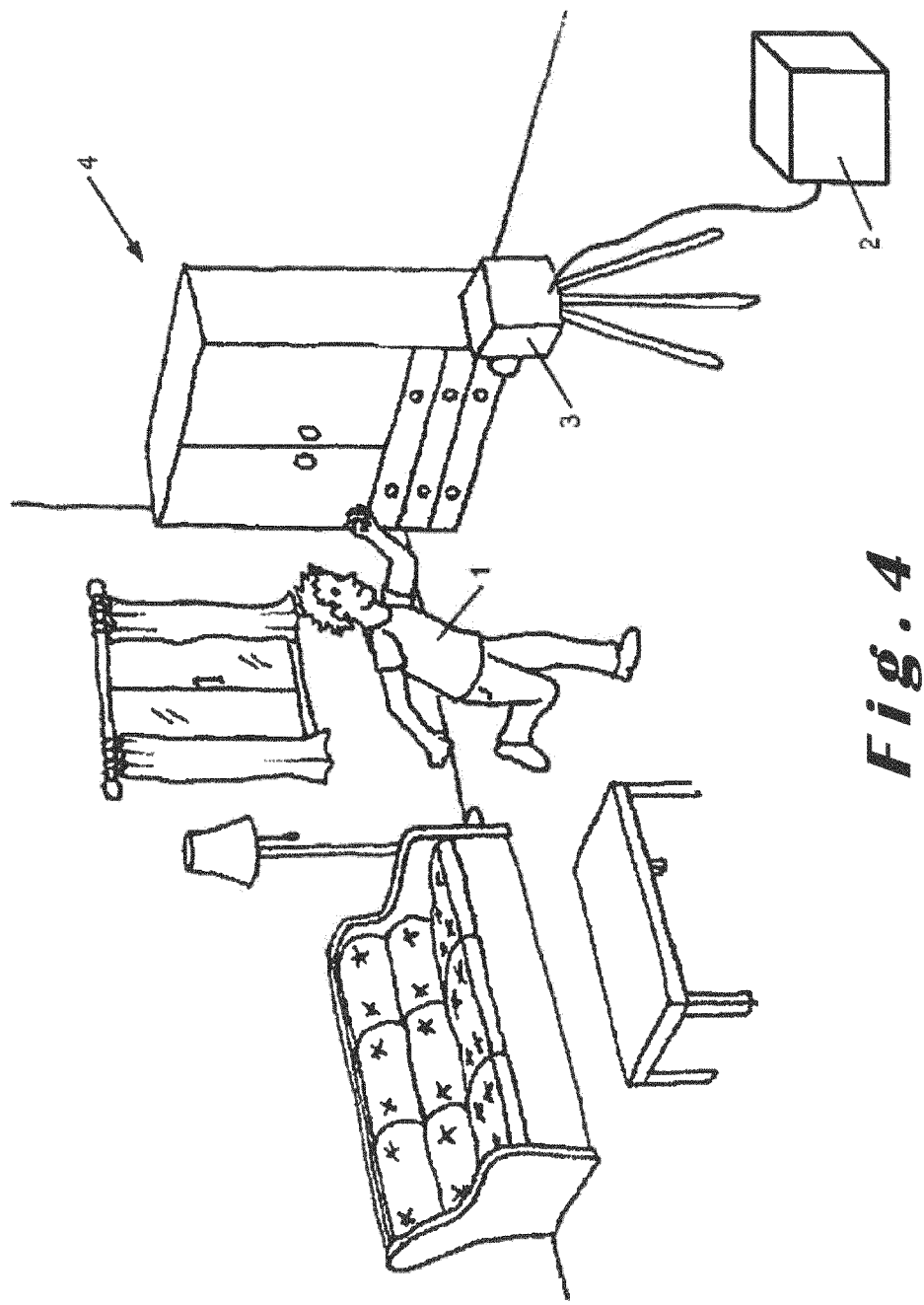
FIG. 4 illustrates a view of a room with a human user interacting with a three-dimensional imaging device connected to a computerised system.

FIG. 4 illustrates a scene 4 including a user 1, an imaging system 3 and a computer or computerised system 2 connected to the imaging system 3 for processing images captured by the imaging system 3. In one embodiment of the present disclosure, the imaging system 3 includes a three-dimensional (3D) imaging system which can be implemented by a time-of-flight (TOF) camera.

The 3D imaging system 3 including a TOF camera acquires, in real time, 3D images of a scene within a field of view of the camera. The image of the user 1, as acquired or transformed by the computer system 2, can be displayed, in real time on a screen or display (not shown), as if the user 1 is present within a virtual environment, and, the user can interact with elements within that virtual environment, for example, to control an interactive computerised system using gesture recognition. Here, the user 1 comprises a foreground region in the image with all other parts of the scene being classified as belonging to one or more background regions. Typically, the foreground regions are used for gesture recognition to control the interactive computerised system.

As described in EP-B-2095296, a 3D image of a scene is provided that comprises a plurality of pixels, each pixel of the image containing at least information relating to the distance of the imaged object to the camera, the depth. Each image of an object in a 3D scene has a depth measurement which can be termed as a "depth map" D. This depth map provides at least a "3D point cloud" data matrix where x- and y-axes correspond respectively to the horizontal and vertical axis with respect to an image plane within the 3D camera, and the z-axis corresponds to the depth, that is, the distance from the image plane within the 3D camera.

The disclosure is described below with reference to the processing of two-dimensional (2D) input data for noise reduction, but it will be appreciated that it is not limited thereto. The description with respect to 2D data can be generalised for one-dimensional data or for ND data as described below.

The term "discontinuity" as used herein refers to a sudden change in values of input or image data, and as such, is not the same as general noise in the input data. This discontinuity may represent a sharp edge, such as, a transition between a background region and a foreground region in a depth map image.

The term "input data" as used herein may refer to a vector, or a matrix, represented by the letter I. In two dimensions, it comprises m×n data points; in one dimension, the input data comprises m data points; and in three dimensions, it comprises m×n×p data points. The input data may be in the form of a grid of such data points.

The term "data point" as used herein refers to data associated with a point in the input data or input image.

S(x, y) as used herein represents an approximation function for two-dimensional (2D) input data and $I_f$ represents the output filtered data or image, computed using the approximation function.

$(x_s, y_t)$ represents any point of the 2D input data I or of the output filtered data $I_f$.

$(x_i, y_i)$ represents any point of the approximation function S(x,y) where S(x,y) is a uniform bicubic B-spline function which is defined by a control lattice on which control points are placed.

The term "control lattice" as used herein refers to a grid of control points is superposed to the input data I. The control points are spaced from one another in each direction.

The spacing s of the control points may be the same as the spacing of the grid of input data, but the spacing of the control points may also be a multiple of the grid spacing of the input data. The larger the spacing, the smoother the resulting approximation.

A bi-lateral filter provides an edge preserving noise reduction or smoothing technique. The value of a filtered data point is a weighted average of neighbouring data points, in a similar way to that provided by a Gaussian convolution, but the bi-lateral filter takes into account the variation of intensities between neighbouring data points in order to preserve discontinuities and edges.

Assuming I is an input two-dimensional data array on which the bi-lateral filter is to be applied; a data point of coordinate (s, t) of the filtered data $I_f(s, t)$ can be expressed as a normalised weighted average;

$$I_f(s,t) = \frac{1}{w}\sum_k\sum_l G_{\sigma_d}(r_{s,t,k,l})G_{\sigma_r}(I(s,t)-I(k,l))I(k,l)$$

where $w=\Sigma_k\Sigma_l G_{\sigma_d}(r_{s,t,k,l})G_{\sigma_r}(I(s,t)-I(k,l))$ is a normalisation factor;

$$G_\sigma(x) = \frac{1}{2\pi\sigma^2}\exp\left(-\frac{x^2}{2\sigma^2}\right)$$

is a Gaussian distribution; $G_{\sigma_d}$ is a distance Gaussian distribution which weights the influence of neighbouring data points according to their distance $$r_{s,t,k,l} = ((s-k)^2+(t-l)^2)^{1/2}$$

as in a Gaussian convolution filter; and $G_{\sigma_I}$ is an intensity Gaussian distribution which weights the influence of two neighbouring data points according to their difference in intensity. The variances $\sigma_d$, $\sigma_I$ determine the amplitude of the filtering of input image I. Larger features are smoothed with a larger $\sigma_d$. The value of $\sigma_I$ depends on the intensity range covered by the image. With a larger $\sigma_I$, the bi-lateral filter approaches the Gaussian convolution as the Gaussian distribution for the intensity is almost uniform for the intensity interval covered by the image.

Figure 5:
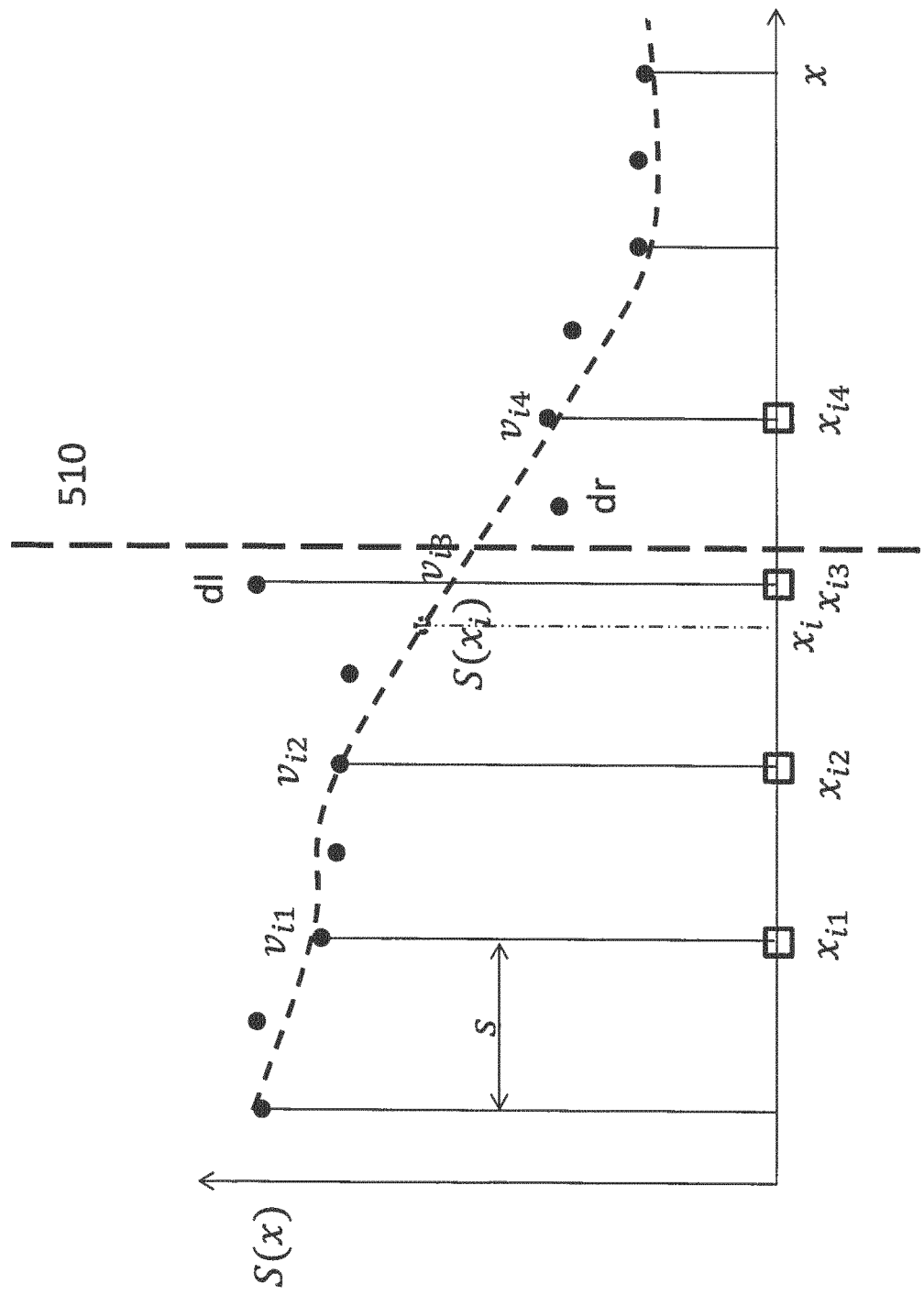
FIG. 5 illustrates the approximation of noisy data with a discontinuity with a continuous spline curve in accordance with the present disclosure.

B-spline approximation as described in Lee et al. is a very powerful and fast smoothing technique which is however not edge preserving. FIG. 5 illustrates the approximation of one-dimensional discontinuous data with B-spline functions, with a discontinuity being blurred by the spline fitting. Data points $x_{i1}$, $x_{i2}$, $x_{i3}$, $x_{i4}$ and control points $v_{i1}$, $v_{i2}$, $v_{i3}$, $v_{i4}$ are shown together with an approximation function $S(x_i)$ for values of $x_i$. A discontinuity 510 is shown between two data points dl and dr.

After defining and superposing a control lattice on the input data, the first step comprises evaluating the value of each control point $v_{i1}$, $v_{i2}$, $v_{i3}$, $v_{i4}$ of the control lattice as a function of its four neighbouring data points. In the one-dimensional case described with reference to FIG. 5, for control point $v_{i3}$, its value is influenced by the values of the two data points $x_{i1}$,$x_{i2}$ located on its left, and the values of the two data points $x_{i3}$, $x_{i4}$ located on its right. However, the data points located on the right of $v_{i3}$ are on the other side of the discontinuity 510 illustrated by the dashed line. These data points will strongly affect the value of control point $v_{i3}$.

The next step comprises determining an approximation function using the values of the control points determined above. The approximation function at each data point $x_i$ is influenced by the value of its four neighbouring control points. The discontinuity 510 is located between the two data points, dl and dr, discontinuity left and discontinuity right respectively. These two data points are not correctly fitted by the approximation function $S(x_i)$.

In order to improve the evaluation of the control points located in the neighbourhood of a discontinuity in the values of the data points, the influence of data points located on the other side of the discontinuity should be decreased in the evaluation of the control points. In addition, the value of the approximation function for a data point located on the other side of a discontinuity, then a control point associated to this data point should preferably take into account the presence of this discontinuity. As illustrated in FIG. 5, the influence of control point $v_{i4}$, located at position $x_{i4}$, should be weighted in the approximation function $S(x_i)$ of the data point of coordinate $x_i$.

The method described above for one-dimensional input data can also be expanded to 2D input data based on similar reasoning. In two dimensions, the value of a control point is influenced by its $4^2$ or 16 neighbouring data points and the value of a point of the approximation function is influenced by its $4^2$ or 16 neighbouring control points.

Similarly, for 3D input data, the value of a control point is influenced by its $4^3$ or 64 neighbouring control points. In this case, depth values are more important for the determination of the presence of a discontinuity or edge in the input data.

More generally, for N-dimensional data, approximated by a spline of degree D, a control point or a data point is determined by the value of its $(D+1)^N$ neighbouring data points or control points respectively.

Figure 6:
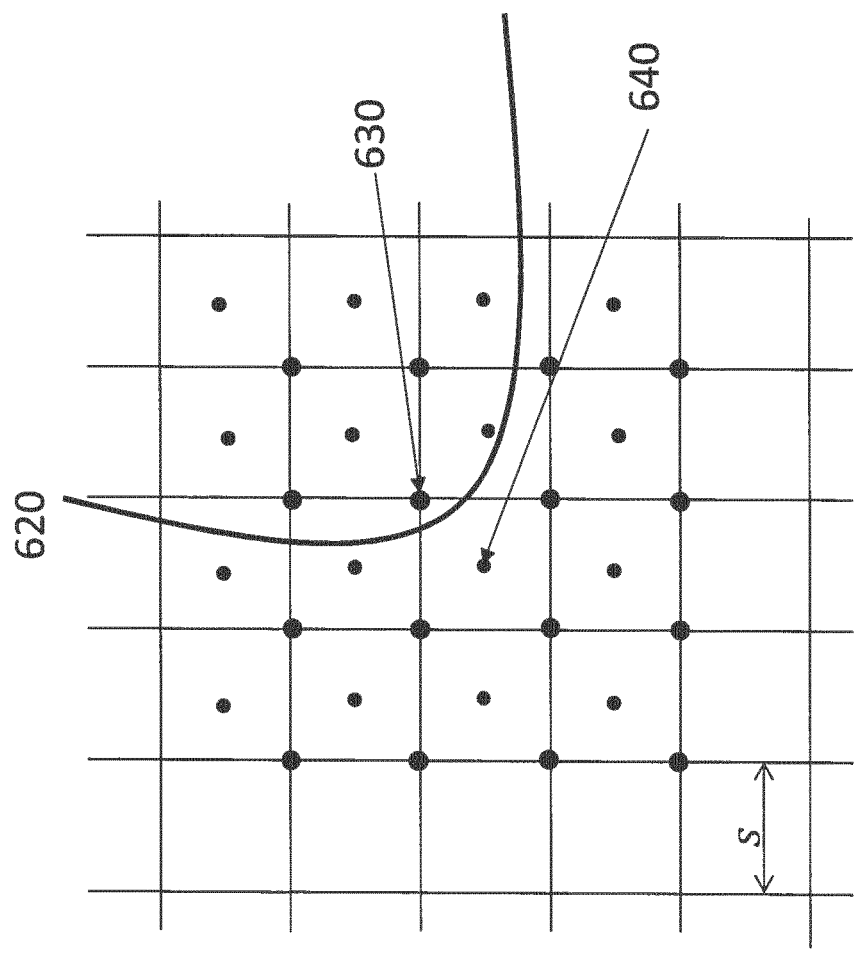
FIG. 6 illustrates a data point, its sixteen associated control points and a discontinuity.

In FIG. 6, curve 620 illustrates a discontinuity in input data. The value of control point 630 will be affected by the sixteen neighbouring data points, which includes the data points located on the other side of the discontinuity 620. In addition, the approximation of data point 640 is influenced by the sixteen control points that surround it, including the four control points located on the upper right of the discontinuity 620.

In order to decrease the influence of data points located on the other side of the discontinuity with respect to this control point, a new term, called the "influence" term, is introduced in the equations above. In classical 2D splines, the weight associated to a spline control point depends only on the spatial distance between the current point (x,y) under consideration and the control point (i,j) as follows $$w_{kl}(a,b) = B_k(a)B_l(b)$$

We propose to define $$w_{kl}(a,b) = B_k(a)B_l(b)d_{xyij}$$

where $d_{xyij}$ is a positive real value called the (mutual) "influence" between point (x,y) and control point (i,j).

Because of this additional term, the weights are not necessarily summing up to 1 as before, and the spline evaluation equation must be normalized in the following way $$S(x,y) = \frac{\sum_{k=0}^{3}\sum_{l=0}^{3} w_{kl}(a,b)v_{i-1+k,j-1+l}}{\sum_{k=0}^{3}\sum_{l=0}^{3} w_{kl}(a,b)}$$

A singularity in the equation above arises when the sum of all influence terms is 0. Such a point can be interpreted as a free point or noise and is therefore discarded. A similar equation for N-dimensions can readily be derived.

The influence term can be binary or continuous, but it should always be positive. These two equations represent a discontinuous spline (D-spline) approximation.

Figure 7:
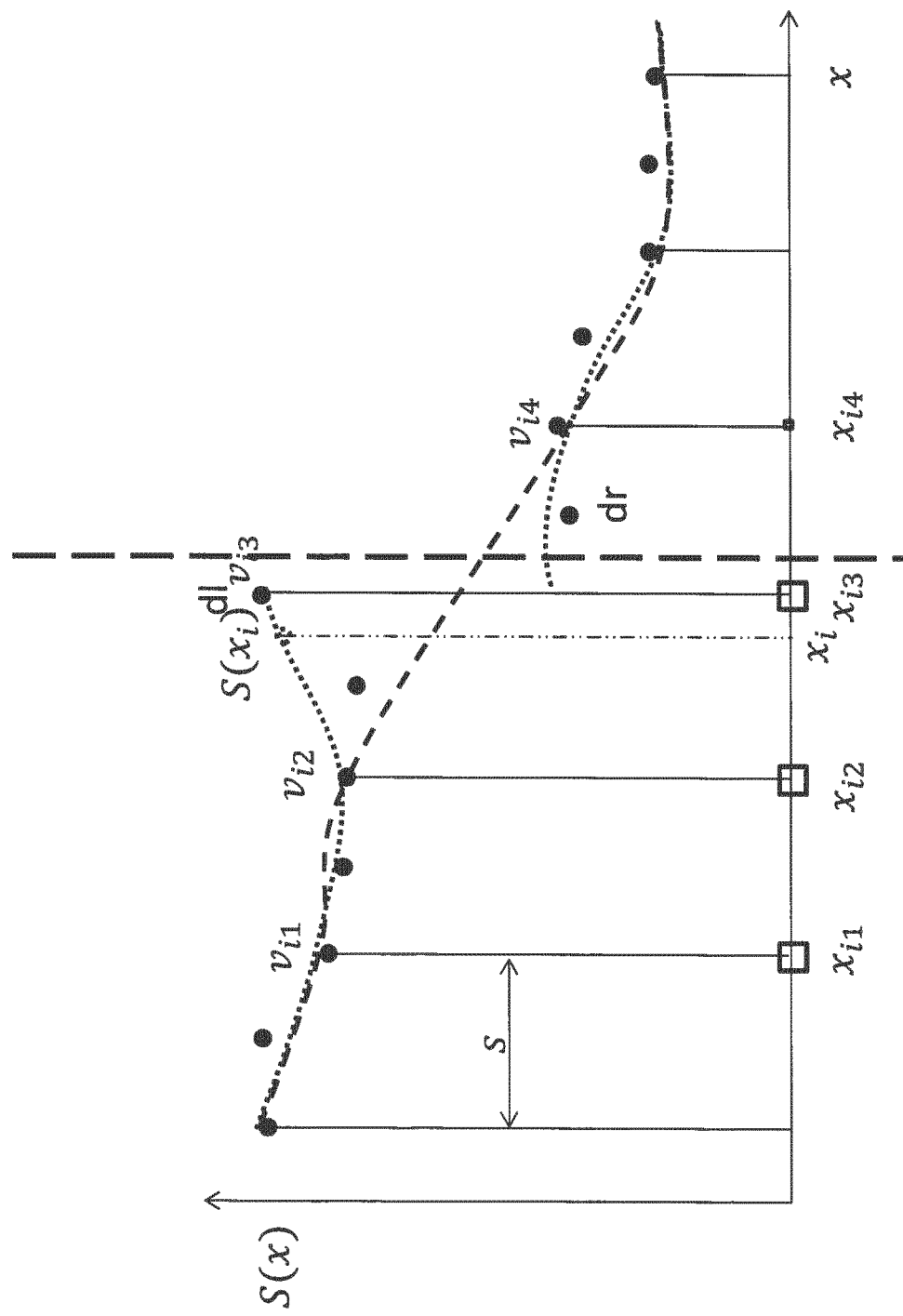
FIG. 7 illustrates the approximation of noisy data with a discontinuity with discontinuous spline curve.

FIG. 7 is similar to FIG. 5 but illustrates the improvement in the approximation of data point $x_i$ in the presence of a discontinuity due to the introduction of the influence term in the approximation function. The approximation function $S(x_i)$ is now a D-spline function.

There are different methods to evaluate the influence term.

In the spirit of bilateral filtering, the term $d_{xyij}$ can depend on the distance between the image value at the point (x,y) and the image value at the position of the control point (i, j)

$$d_{xyij} = F(I(X,y) - I(u_{ij}^x, u_{ij}^x))$$

where F is a positive decreasing function. If the values of the image at the data point and at the control point are close, the influence term is high. If the values of the data points and the control point show high discrepancy, the influence term is close to 0.

Advantageously, if the absolute difference between the approximation value of a data point and a control point is lower than a given threshold, the influence term is 1, and, if the absolute difference is higher that the threshold, the influence term is 0. In this embodiment, the influence term is binary. Advantageously, the threshold is set by a user, or it may also be set automatically.

In another embodiment, the influence term can be evaluated with a Gaussian distribution:

$$d_{xykl} = G_{\sigma_l}(I(x,y) - I(u_{ij}^x, u_{ij}^x))$$

where $$G_\sigma(x) = \frac{1}{2\pi\sigma^2}\exp\left(-\frac{x^2}{2\sigma^2}\right)$$

and $G_{\sigma_l}$ is a Gaussian distribution which weights the influence of neighbouring data points according to their difference in intensity, or intensity range, with respect to the current data point, as with a bi-lateral filter.

The complexity of the algorithm for evaluating the influence term is sixteen operations per data point in two dimensions. For m×n data points, it is therefore m×n×16.

The last step comprises creating a filtered output image $I_f$ from the approximation function S. For each data point (x, y) of the input image I, the approximation function S(x, y) is computed and stored in an output filtered image $I_f$.

The density of the control points, determined by the spacing s between the control points, determines the spatial size of the features that have been smoothed away. A non-exclusive and limiting example of the scale parameter of the method described herein may be $\sqrt{4s}$. Using such a scale parameter would be equivalent to the variance of a Gaussian in the Gaussian convolution filter, or could either be equivalent to the kernel size when convolving an image with a kernel.

The advantage of the method according to the present disclosure is that the complexity of this edge preserving smoothing method is linear with respect to the size of the input data, and is independent of the scale parameter. The edge preserving smoothing method according to the present disclosure is capable of making arbitrarily smooth approximations but always in a constant computational time and while preserving edges.

Another advantage of the spline approximation is that once the spline lattice has been determined, the spline weights can be pre-computed. Therefore, the number of operations required to approximate each data point corresponds to four multiplications and four additions in one dimension, and sixteen multiplications and sixteen additions in two dimensions together with the evaluation of the "influence" function.

Another advantage is that the final filtered image can be arbitrarily subsampled to increase the output resolution because the spline interpolation method provides a continuous fitting function (piecewise bi-cubic).

In addition, the derivatives of the spline can be evaluated in closed form (just deriving the basis functions), hence for example an exact gradient of the filtered image can be directly obtained.

The method described above can be used in an embodiment for noise reduction or smoothing of a depth map obtained as part of a 3D image obtained using a TOF imaging system. Using the method described above, the discontinuities and the edges which are present in the depth map are not smoothed but preserved due to the weighting applied during the performance of the method as described above with reference to FIG. 7.

Figure 8A:
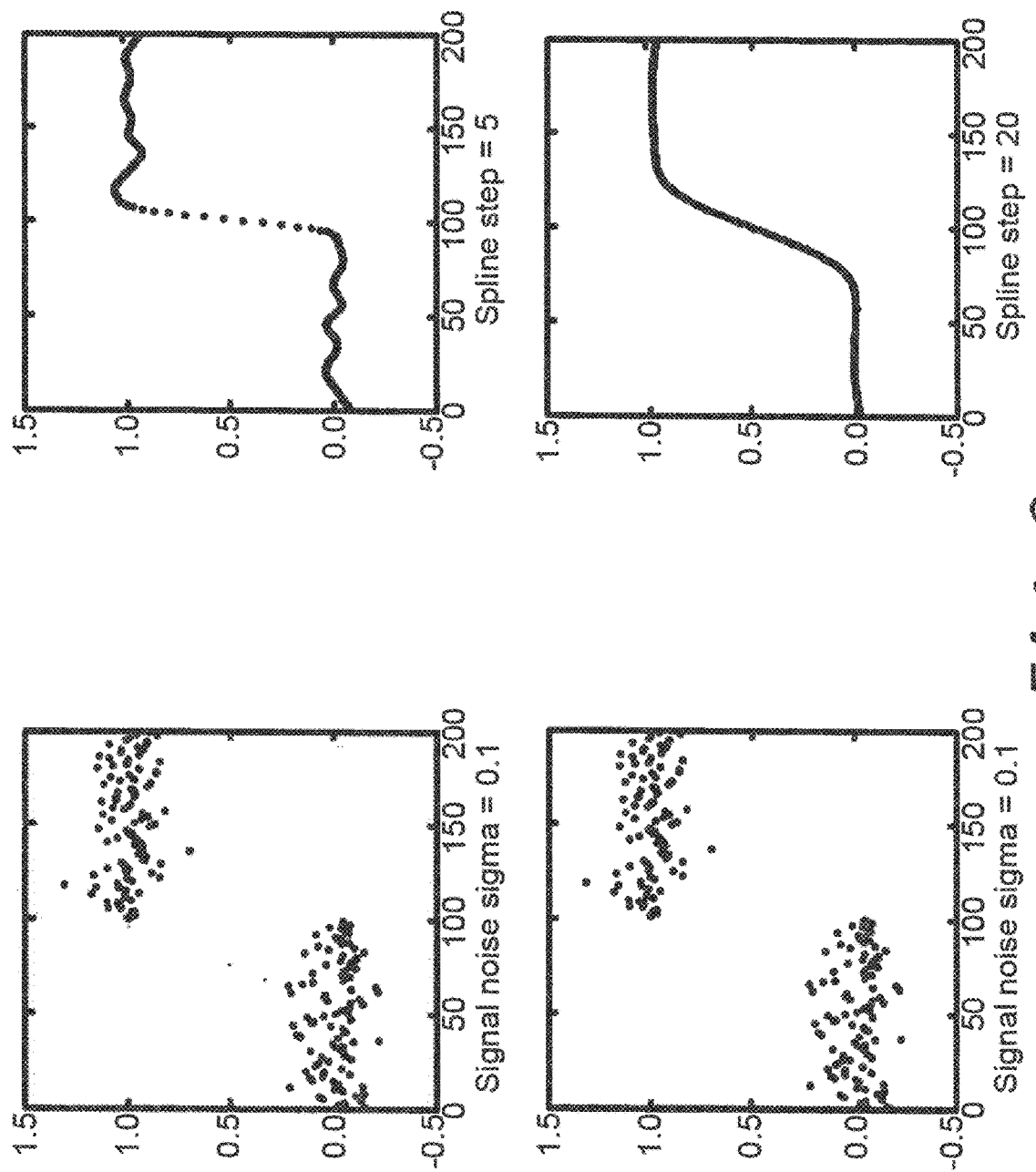
FIGS. 8a and 8b together illustrate a comparison of signal noise reduction for different SDpline steps.
Figure 8B:
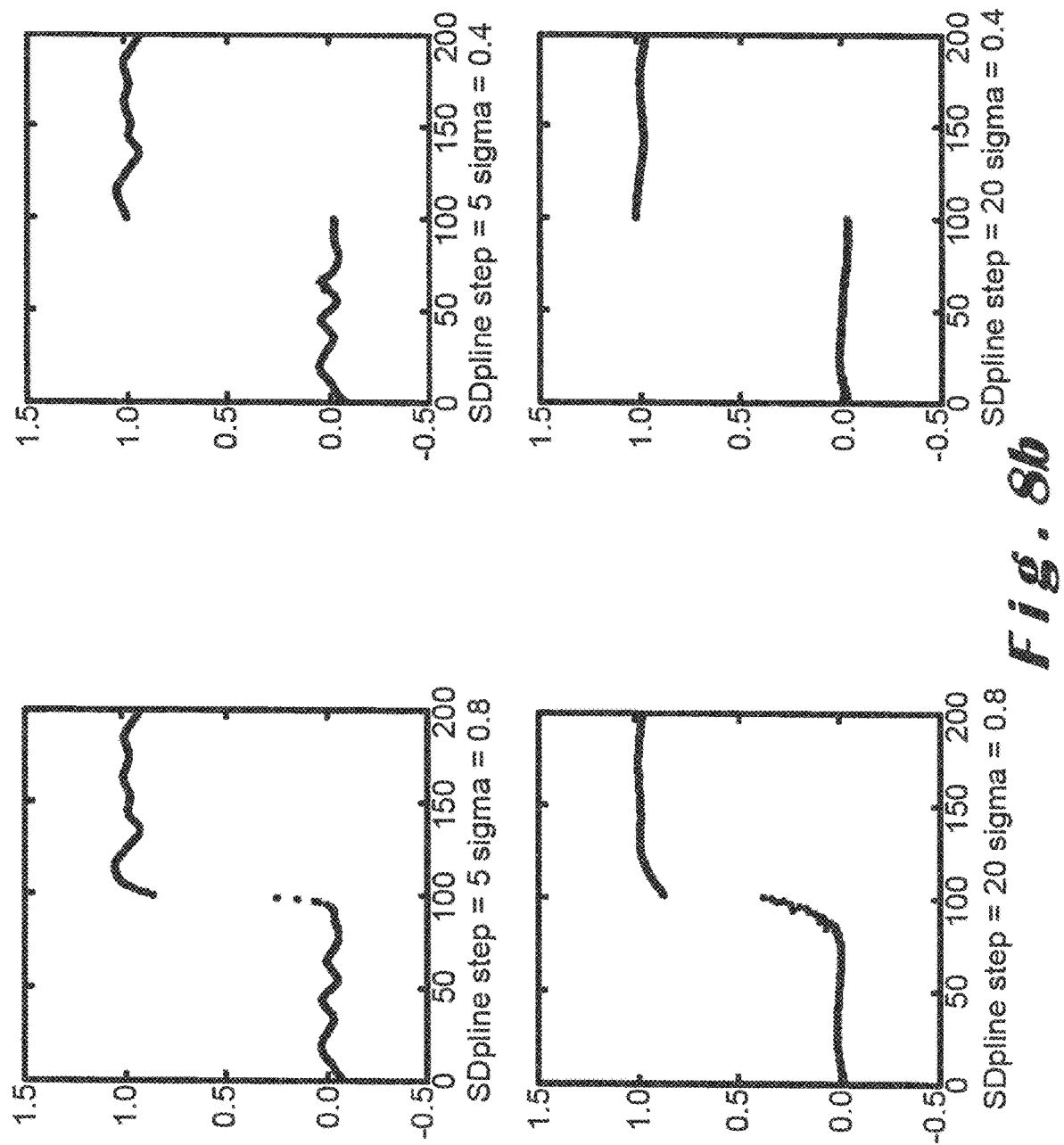

FIGS. 8a and 8b together illustrate the effect of using spline filters on a signal having two discrete regions to remove noise in the signal. The top row of each Figure illustrating the effect of a spline step having a value of 5 on the signal noise (that is, signal together with noise) for different values of sigma, and, the bottom row of each Figure illustrating the effect of a spline step having a value of 20 on the same signal noise as the top row for different values of sigma.

The signal noise is shown as having two regions, a first region around the 0.0 level and a second region around the 1.0 level with a value of sigma of 0.1 (left-hand side of FIG. 8a).

When a spline step of 5 is applied, as shown in the top right-hand corner of FIG. 8a, the signal still has some undulations in its waveform in the two regions with a discontinuity as shown by the dotted line, the discontinuity joining the two regions at 0.0 and 1.0.

When a spline step of 20 is applied, as shown in the bottom right-hand corner of FIG. 8a, the signal has a substantially uniform waveform in the two regions with a discontinuity shown as a solid line joining the two regions at 0.0 and 1.0.

Neither the application of the spline step of 5 nor the application of the spline step of 20 provides an output having a definite edge between the two regions at 0.0 and 1.0 as described above.

When SDpline steps of 5 and 20 are applied as shown in the top and bottom rows respectively of FIG. 8b, with a sigma value of 0.8 as shown on the left-hand side of the Figure, there is still some indication of noise in between the two region as shown by the upwardly extending lines at the end of the region at 0.0.

When the sigma value is reduced to 0.4, as shown on the right-hand side of FIG. 8b, a definite edge is seen as there is no link between the first and second regions. In such a way, definite edges present in the original unfiltered data can be maintained during noise reduction.

It will readily be appreciated that although FIGS. 8a and 8b illustrate filtering of a two-dimensional input data, this filtering can readily be extended for use with multi-dimensional input data.

Although the specific embodiments of the present disclosure have been described above, it will readily be understood that the disclosure is not limited to such embodiments.

Note that the present technology can also be configured as described below.

(1) A method of noise reduction for multi-dimensional input data including a plurality of data points spaced from one another in each dimension, the method including the steps of:
  a) defining at least one control lattice for the input data, each control lattice having a plurality of control points separated by a predetermined spacing;
  b) superposing each control lattice on the input data;
  c) defining, for each data point in the input data, a number of control points surrounding the input data point;
  d) computing, for each control point, a value which is a function of neighbouring data points;
  e) determining, for each data point, an approximation function from at least values of neighbouring control points;
  f) using the approximation function to filter the input data to generate filtered output data; and
  e) applying a weighting to at least one control point associated with a data point in the vicinity of a discontinuity.

(2) The method according to (1), wherein the weighting is 1 if the difference of the absolute value of the image at the data point and at the control point is lower than a predetermined threshold.

(3) The method according to (2), wherein the weighting is 0 if the difference of the absolute value of the image at the data point and at the control point is higher than the predetermined threshold.

(4) The method according to any one of (1) to (3), wherein the approximation function comprises an N-dimensional approximation function and step c) includes, for each data point, defining $4^n$ control points surrounding the data point.

(5) The method according to (4), wherein the N-dimensional approximation filter includes a set of uniform cubic B-spline functions.

(6) The method according to (5), wherein step e) further includes defining the N-dimensional approximation function as a linear combination of control points and the set of uniform cubic B-spline functions for each dimension.

(7) The method according to (5) or (6), further including the steps of pre-computing and tabulating the set of uniform cubic B-spline functions.

(8) The method according to any of (1) to (7), wherein step d) includes pre-computing and tabulating values for the control points.

(9) The method according to (1) to (8), wherein step e) further includes multiplying the value of each control point by the weighting related to the associated data point.

(10) The method according to any one of (1) to (9), wherein the weighting includes a Gaussian distribution of given variance and a function of a difference between the values of the image at the data point and at the control point.

(11) The method according to any one of (1) to (10), wherein the filtered output data includes the same dimensions as the input data.

(12) An image processing system including:
an imaging system configured to capture at least one image; and
circuitry configured to perform the steps of the method according to any one of (1) to (11).

(13) The image processing system according to (12), wherein said imaging system includes a three-dimensional imaging device for capturing depth information, and the input image includes a depth map.

(14) The image processing system according to (12), further comprising a display;
wherein the circuitry is further configure to cause the display to display the at least one captured image.

(15) A computer-readable data storage medium containing computer-executable instructions for carrying out a method according to any one of (1) to (11).

The invention claimed is:

1. A method of noise reduction for multi-dimensional input data comprising a plurality of data points spaced from one another in each of multiple dimensions, the method comprising:
a) defining at least one control lattice for the input data, each of the at least one control lattice having a plurality of control points separated by a predetermined spacing;
b) superposing each of the at least one control lattice on the input data;
c) defining, for each of the plurality of data points in the input data, a number of control points of the plurality of control points of the at least one control lattice surrounding the data point;
d) computing, for each control point, a value which is a function of values of neighbouring data points;
e) determining, for each data point of the plurality of data points in the input data, an approximation function from at least values of neighbouring control points, wherein determining the approximation function comprises applying a weighting to each of the values of the neighbouring control points based on a comparison of a value of the data point in the input data and the computed value of the neighbouring control point; and
f) using the approximation function to filter the input data to generate filtered output data.

2. The method according to claim 1, wherein the weighting is 1 if the difference of an absolute value of the the data point in the input data and the computed value of the neighbouring control point is lower than a predetermined threshold.

3. The method according to claim 2, wherein the weighting is 0 if the difference of an absolute value of the the data point in the input data and the computed value of the neighbouring control point is higher than the predetermined threshold.

4. The method according to claim 1, wherein the approximation function comprises an N-dimensional approximation function and step c) comprises, for each data point, defining 4N control points surrounding the data point.

5. The method according to claim 4, wherein the N-dimensional approximation filter comprises a set of uniform cubic B-spline functions.

6. The method according to claim 5, wherein step e) further comprises defining the N-dimensional approximation function as a linear combination of the neighbouring control points and the set of uniform cubic B-spline functions for each dimension.

7. The method according to claim 5, further comprising the steps of pre-computing and tabulating the set of uniform cubic B-spline functions.

8. The method according to claim 1, wherein step d) comprises pre-computing and tabulating values for the control points.

9. The method according to claim 1, wherein applying the weighting comprises multiplying the value of the neighbouring control point by the weighting.

10. The method according to claim 1, wherein a distribution of the weightings applied to the values of the neighbouring control points comprises a Gaussian distribution.

11. The method according to claim 1, wherein the filtered output data comprises a same number of dimensions as the input data.

12. An image processing system comprising:
an imaging system configured to capture at least one image; and
circuitry configured to perform the steps of the method according to claim 1.

13. The image processing system according to claim 12, wherein said imaging system comprises a three-dimensional imaging device for capturing depth information, and the input data comprises a depth map.

14. The image processing system according to claim 12, further comprising a display;
wherein the circuitry is further configured to cause the display to display the captured at least one image.

15. A non-transitory computer-readable data storage medium containing computer-executable instructions that, when executed by at least one computer processor perform a method comprising:
a) defining at least one control lattice for the input data, each of the at least one control lattice having a plurality of control points separated by a predetermined spacing;
b) superposing each of that least one control lattice on the input data;
c) defining, for each of the plurality of data points in the input data, a number of control points of the plurality of control points of the at least one control lattice surrounding the data point;
d) computing, for each control point, a value which is a function of values of neighbouring data points;
e) determining, for each data point of the plurality of data points in the input data, an approximation function from at least values of neighbouring control points, wherein determining the approximation function comprises applying a weighting to each of the values of the neighbouring control points based on a comparison of a value of the data point in the input data and the computed value of the neighbouring control point; and f) using the approximation function to filter the input data to generate filtered output data.

* * * * *

UNITED STATES PATENT AND TRADEMARK OFFICE
CERTIFICATE OF CORRECTION

| | | |
|---|---|---|
| PATENT NO. | : 10,902,560 B2 | Page 1 of 1 |
| APPLICATION NO. | : 16/086437 | |
| DATED | : January 26, 2021 | |
| INVENTOR(S) | : Laurent Guigues | |

It is certified that error appears in the above-identified patent and that said Letters Patent is hereby corrected as shown below:

On the Title Page

Item (54) and in the Specification, Column 1 Line 1:
"OR RELATING TO FILTERS" should read --IMPROVEMENTS IN OR RELATING TO FILTERS--

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*